July 2, 1946.   W. A. HEYMAN   2,402,999
DEHYDRATED CARAMEL COLOR
Filed Aug. 21, 1943
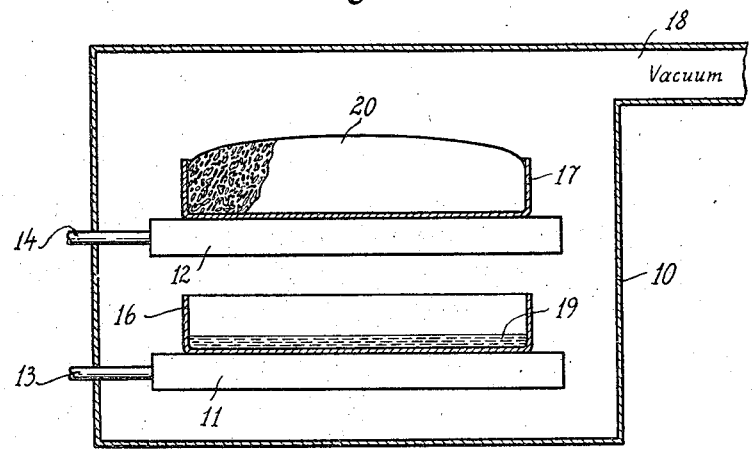
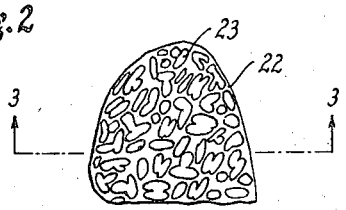
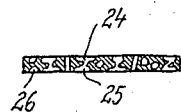
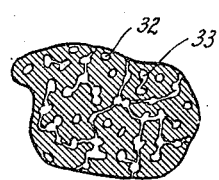
INVENTOR
Wilbert A. Heyman
BY Pineles & Greene
ATTORNEYS Patented July 2, 1946

2,402,999

UNITED STATES PATENT OFFICE 2,402,999

DEHYDRATED CARAMEL COLOR

Wilbert A. Heyman, New York, N. Y., assignor to Granular Foods, Inc., New York, N. Y., a corporation of Indiana Original application August 3, 1940, Serial No. 351,265. Divided and this application August 21, 1943, Serial No. 499,560

2 Claims. (Cl. 127—34)

My invention relates to a novel process for the manufacture of solid relatively non-hygroscopic caramel and the product produced thereby. More specifically my invention relates to a method in which I subject a mix of caramel liquid to heat under a relatively high vacuum so that cells are formed from the water vapor developed within the caramel by heat, such cells being expanded by the action of heat on the contained water vapor and the vacuum externally applied so that an expanded cellular solid mass of dry caramel is obtained, which cellular structure upon cooling may be broken down or ground to the form of relatively small discrete particles, the characteristics of which are such that the dry caramel is in a readily advailable and stable form.

This application is a division of my copending application Serial No. 351,265 filed August 3, 1940 for Expanded solid corn syrup.

Caramel color is shipped in commerce in the form of a heavy viscous liquid. This is undesirable because of the many disadvantages of shipping and handling of materials in liquid form.

Further, the heavy viscous liquid is difficultly soluble and hence its processing or use in industry requires skilled handling.

It is the object of the present invention to provide a caramel color in solid form.

It is a further object of the present invention to convert the heavy viscous liquid caramel color of commerce into a solid dehydrated form that can be easily packaged, shipped and handled.

It is a further object of the present invention to convert the viscous liquid caramel color of commerce to a solid form that is easily soluble in cold fluids.

Further objects of the present invention will be apparent from a consideration of the general description thereof and the specific description which here follows.

Generally, I accomplish the objects of my invention by taking liquid caramel color, which is formed by burning corn sugar in the presence of a suitable catalyst, such as ammonia, and subjecting that liquid caramel color to a relatively high vacuum and then applying heat to boil and dehydrate this liquid caramel color.

In the course of heating under vacuum, the caramel color becomes more viscous and the bubbles developed therein in this operation become entrapped in the viscous mass, the applied heat expanding the bubbles, the expansion being accelerated by the reduced pressure of the vacuum. Because of the expanding bubbles in the mass, the entire mass expands, the application of heat and vacuum being continued until the bubbles expand and burst into one another. At this point the mass becomes set and solid in a dehydrated form.

It is now friable and may be crushed by suitable grinding means to form particles of any desired size.

Figure 1 diagrammatically represents the apparatus employed in my invention.

Figure 2 is a plan view of the exterior of the dry particles product of my invention formed from caramel color.

Figure 3 is a cross section taken along the line 3—3 of Figure 2.

Figure 4 is an interior section of the particle shown in Figure 2 showing the intercommunicating cells.

In Figure 1 I show a chamber 10 in which are located hollow shelves 11 and 12. By means of suitable feed pipes 13 and 14, hot or cold fluids, such as steam and cold water, can be fed to the hollow shelves 11 and 12 to suitably heat or cool the same. Positioned on the hollow shelves 11 and 12 are trays 16 and 17 adapted to hold the caramel liquid during the processing thereof. Through a suitable feed pipe 18 reduction of pressure within the chamber 10 is effected by means of vacuum. A suitably sealed door, not shown here, may be employed to provide access to the chamber.

According to the process of my invention I take the liquid caramel color of commerce formed by burning corn sugar in the presence of a suitable catalyst, such as ammonia, according to methods known in this art, and pour that into the pan 16 so that the caramel liquid fills the pan to a depth of approximately three-sixteenths of an inch. For example, in a pan having a drying surface of 756 square inches, I employ one-half gallon of liquid caramel color. The pan 16 is then placed on the shelf 11 which is heated by means of steam applied thereto and vacuum is applied through the pipe 18. The temperature of the caramel during this process rises from 118° F. about fifteen minutes after the process is begun, to about 176° F. when the process is complete. The vacuum applied at the beginning may vary, but I prefer to employ a high vacuum as the caramel begins to dry and solidify and this high vacuum should be on the order of an inch to an inch and a half of mercury at this point. An even higher vacuum is desirable if practical.

When the caramel is subjected to the heat and the vacuum it commences to boil and the water contained therein is driven off. As the caramel boils, the material becomes more and more viscous and dehydrated and the water vapor developed therein by the heat becomes entrapped in the form of a myriad of bubbles. These bubbles are expanded by the heat which expands the water vapor contained therein and the bubbles are also expanded by the lowered external pressure resulting from the vacuum.

When in this specification I refer to a vacuum of an inch or an inch and a half of mercury, I mean a vacuum that is an inch or an inch and a half from perfect vacuum. Mercurial measurement of this vacuum varies according to the atmospheric barometric pressure at the time.

The viscous caramel expends under the influence of these bubbles to a height of four inches or more. The exact expansion is controlled by the heat and vacuum employed. For extremely light fluffy, friable and porous material as high vacuum as possible is desirable. When a lower vacuum is employed, the cellular structure may be obtained but the mass is harder, more difficult to grind and heavier. As a result of the expansion and vacuum, the gas bubbles in the caramel finally break which permits the further dehydration of the internal structure since the heat and vacuum drive off the moisture vapor and moisture contained in the mass. I can obtain this expanded cellular structure according to my invention because of the elasticity and expandability of the dextrin component of the caramel which has the characteristic of elasticity when containing water and rigidity when dehydrated. The point of demarkation between the rigid dextrin and the elastic dextrin may be placed at approximately two to two and one half per cent of moisture.

The final expanded product of my invention has a moisture content of about .5% to 2% and an apparent density of 13 pounds per cubic foot, and this final product may be obtained after about three and one half hours of heating.

After the caramel is dehydrated, dried and expanded to the form shown at 20 and described hereinabove, the steam is shut off and cold water is introduced through the pipe 14. I have shown diagrammatically the cellular structure of the expanded dry caramel. It is to be understood that this is only diagrammatic and that the actual cellular structure provides for a multiplicity of thin stretched walls of caramel such that when the cellular structure is broken down a multiplicity of flake like bodies results.

After the trays are thoroughly cooled, the vacuum is broken and the trays are removed from the chamber and the expanded cellular mass of dry caramel is removed from the pans. The product formed is friable and fluffy and this material may be reduced to small flake like form shown in Figure 2 by relatively light pressure since a hand pressure alone could be employed to press the material through a screen mesh.

After the product 20 is screened through a suitable mesh, small flake like particles, such as 22 shown in Figure 2 are formed, characterized by openings 23, which are a result of the bubbles and channels from within the mass. In cross section as shown in Figure 3, this material is flake like, having a relatively small thickness, and the bubbles 24 and 25 are interconnected, forming channels throughout the material. The bubble 26 is isolated.

The structure here shown has the two advantages previously generally referred to above. First the flake like form presents a lesser surface exposure to the taking up of moisture than does a powder. Secondly, the flake like form with the channels and bubbles contained therein is readily dissolvable by a liquid since the relative distances to be attacked are small and when a solvent is applied to the flake, its action is almost immediate.

In the commercial usage of this product, it therefore follows that a solid caramel having a low moisture content can be shipped, stored, and handled for an extended period of time, more in fact than is normally necessary, without any objectionable lumping or stickiness.

The physical shape of the material is important from the standpoint of ready solubility, since the primary utility for solid caramel involves its dissolution in aqueous vehicles. The porous, fluffy, flake like form of my solid expanded caramel makes possible its quick dissolution.

A further feature of the fluffy particle form of my invention lies in the fact that it is irregular, and porous in shape and this physical condition is responsible for a quick dispersion in an aqueous medium, such as water.

The expanded structure I obtain comprises an agglomerate of bubbles developed as pointed out hereinbefore. These bubbles for the large part are interconnecting affording a continuous passageway for penetration of fluids or gases throughout the material. There are, however, in certain cases isolated bubbles that are not interconnected.

The cooling of the expanded material after processing is primarily for handling, since the dehydration effects the setting of the expanded caramel.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. A solid dehydrated expanded cellular caramel, the cells of which are formed and caused to break into communication with one another by heating liquid caramel and expanding said heated liquid caramel under a high vacuum, said caramel setting in solid dehydrated cellular form, said cells intercommunicating with one another.

2. In the process of converting liquid corn sugar caramel color to a dehydrated solid expanded caramel product, the steps of heating liquid caramel in the presence of a vacuum at least as high as one and one-half inches of absolute to cause said liquid caramel to boil, a part of the water contained in said liquid caramel being thus driven off as water vapor in the form bubbles; continuing the heat and vacuum until sufficient water has been driven off so that the caramel becomes a stiff mass of such viscosity that the water vapor bubbles are entrapped therein; causing the entrapped water vapor bubbles to expand under the influence of the heat and vacuum applied thereto so as to expand the caramel, the expanding bubbles breaking into one another and breaking open at the surface of the mass to form intercommunicating cells in the interior of the relatively stiff caramel which cells communicate with the exterior of the mass by such surface breaking; applying further heat and vacuum so as to dehydrate the dextrin of the caramel and cause it to become substantially rigid and to drive out the moisture from the exposed interior of the caramel and thus set said caramel in the form of a solid dehydrated expanded mass.

WILBERT A. HEYMAN.